US012724124B2

(12) United States Patent
Kamakura

(10) Patent No.: US 12,724,124 B2
(45) Date of Patent: Sep. 1, 2026

(54) DISTANCE MEASURING DEVICE AND ROBOT

(71) Applicant: Seiko Epson Corporation, Tokyo (JP)

(72) Inventor: Kei Kamakura, Hara (JP)

(73) Assignee: SEIKO EPSON CORPORATION (JP)

( * ) Notice: Subject to any disclaimer, the term of this patent is extended or adjusted under 35 U.S.C. 154(b) by 1237 days.

(21) Appl. No.: 17/381,447

(22) Filed: Jul. 21, 2021

(65) Prior Publication Data

US 2022/0026538 A1 Jan. 27, 2022

(30) Foreign Application Priority Data

Jul. 22, 2020 (JP) ................................ 2020-125292

(51) Int. Cl.

*G01S 7/481* (2006.01)
*B25J 19/02* (2006.01)
*G01B 11/25* (2006.01)
*G01S 17/08* (2006.01)

(52) U.S. Cl.

CPC ........... *G01S 7/4817* (2013.01); *B25J 19/022* (2013.01); *G01B 11/2518* (2013.01); *G01S 17/08* (2013.01)

(58) Field of Classification Search

CPC ........ G01S 7/4817; G01S 17/08; G01S 17/46; G01S 17/89; B25J 19/022; G01B 11/2518; G01B 11/026; G02B 26/105; G02B 26/0833; G02B 26/085; G01C 3/00

See application file for complete search history.

(56) References Cited

U.S. PATENT DOCUMENTS 4,969,107 A * 11/1990 Mizutani ................ B25J 19/022 219/124.34
2004/0160507 A1* 8/2004 Ishihara .................. B41J 2/473 347/134
2009/0103156 A1* 4/2009 Lim ...................... H04N 1/047 359/201.1

(Continued)

FOREIGN PATENT DOCUMENTS

JP 2010002636 A * 1/2010
JP 2011180103 A * 9/2011 ........... G01S 17/931

(Continued)

OTHER PUBLICATIONS

Machine translation for JP2010002636A (Year: 2010).*

(Continued)

*Primary Examiner* — Michelle M Iacoletti
(74) *Attorney, Agent, or Firm* — Harness, Dickey & Pierce, P.L.C.

(57) ABSTRACT

A distance measuring device includes a light output unit outputting a linear laser beam, a light scanning unit including a mirror that reflects the laser beam from the light output unit while swinging and generating a pattern light on an object, a light detection unit placed in a position equal to or less than 90% of maximum swing amplitude of the mirror, and receiving the light reflected by the mirror and outputting a light reception signal, an imaging unit imaging the pattern light, a measuring unit measuring a distance to the object based on a result of imaging by the imaging unit, and a control unit controlling generation of the pattern light based on the light reception signal.

7 Claims, 12 Drawing Sheets

(56) References Cited

U.S. PATENT DOCUMENTS

| | | | | |
|---|---|---|---|---|
| 2009/0201095 | A1 * | 8/2009 | Onuma ................ | G02B 26/105 331/65 |
| 2019/0094017 | A1 * | 3/2019 | Wakabayashi ......... | B25J 9/1697 |

FOREIGN PATENT DOCUMENTS

| | | | | | |
|---|---|---|---|---|---|
| JP | 2017-125801 | A | | 7/2017 | |
| JP | 2020159731 | A | * | 10/2020 | |
| WO | WO-2013133286 | A1 | * | 9/2013 | ......... G01B 11/2513 |

OTHER PUBLICATIONS

Espacenet machine translation for JP2011180103 (A) (Year: 2011).*
Espacenet machine translation for WO2013133286A1 (Year: 2013).*
Espacenet machine translation JP2020159731A (Year: 2020).*

* cited by examiner

HOST COMPUTER
100
200
201
C1
C2
C3
300
301
CK
TR
1
2
3
4
6
7
9
10
11
12
21
22
23
24
25
30
31
32
33
34
35
36

FIG. 3

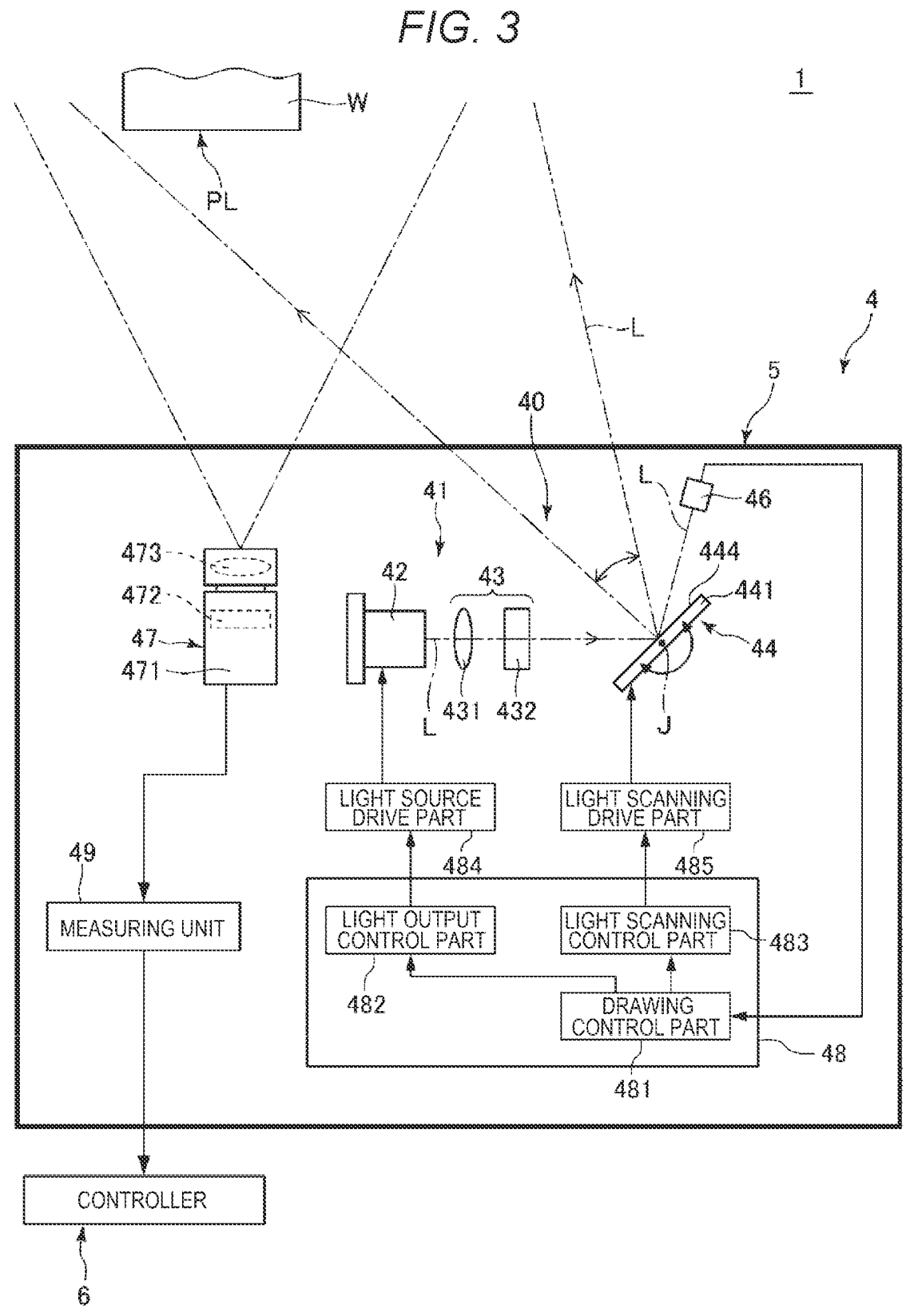

1
W
PL
L
4
5
40
41
46
444
441
44
J
473
472
47
471
42
43
431
432
L
LIGHT SOURCE DRIVE PART
484
LIGHT SCANNING DRIVE PART
485
49
MEASURING UNIT
LIGHT OUTPUT CONTROL PART
482
LIGHT SCANNING CONTROL PART
483
DRAWING CONTROL PART
481
48
CONTROLLER
6

*FIG. 6*

DRAWING TABLE ON TIME AXIS $t_{(k+1)}$

| SWING ANGLE | LD VALUE | TIME |
|---|---|---|
| $\theta_1$ | $D_1$ | $t_{(k+1), 1}$ |
| $\theta_2$ | $D_2$ | $t_{(k+1), 2}$ |
| ... | ... | ... |
| $\theta_N$ | $D_N$ | $t_{(k+1), N}$ |

DISTANCE MEASURING DEVICE AND ROBOT

The present application is based on, and claims priority from JP Application Serial Number 2020-125292, filed Jul. 22, 2020, the disclosure of which is hereby incorporated by reference herein in its entirety.

BACKGROUND

1. Technical Field

The present disclosure relates to a distance measuring device and a robot.

2. Related Art

JP-A-2017-125801 discloses a method for three-dimensional measurement of an object by projecting a pattern light formed by scanning with a laser beam using an optical scanner on the object and imaging the object with the pattern light projected thereon using a camera. In the three-dimensional measurement method, the three-dimensional measurement is performed by analyzing the imaging result of the pattern light, and projection reproducibility of the pattern light affects measurement accuracy. Accordingly, a system with a light detection unit detecting a part of the pattern light for controlling the time to project the pattern light based on the detection result is studied. According to the system, the projection reproducibility of the pattern light may be increased. Usually, the light detection unit detects and outputs a part of the pattern light as a current signal. The current signal contains frequency information vibrating at a predetermined frequency according to changes in light amount of the pattern light.

However, in the three-dimensional measurement method, the frequency information contained in the current signal may contain jitter, i.e., timing fluctuations. When the jitter occurs, the projection reproducibility decreases and causes reduction in measurement accuracy.

SUMMARY

A distance measuring device according to an application example of the present disclosure includes a light output unit outputting a linear laser beam, a light scanning unit including a mirror that reflects the laser beam from the light output unit while swinging and generating a pattern light on an object, a light detection unit placed in a position equal to or less than 90% of maximum swing amplitude of the mirror, and receiving the light reflected by the mirror and outputting a light reception signal, an imaging unit imaging the pattern light, a measuring unit measuring a distance to the object based on a result of imaging by the imaging unit, and a control unit controlling generation of the pattern light based on the light reception signal.

A robot according to an application example of the present disclosure includes the distance measuring device according to the application example of the present disclosure.

BRIEF DESCRIPTION OF THE DRAWINGS

FIG. 3 shows an overall configuration of an object recognition sensor shown in FIG. 2.

Figure 6:
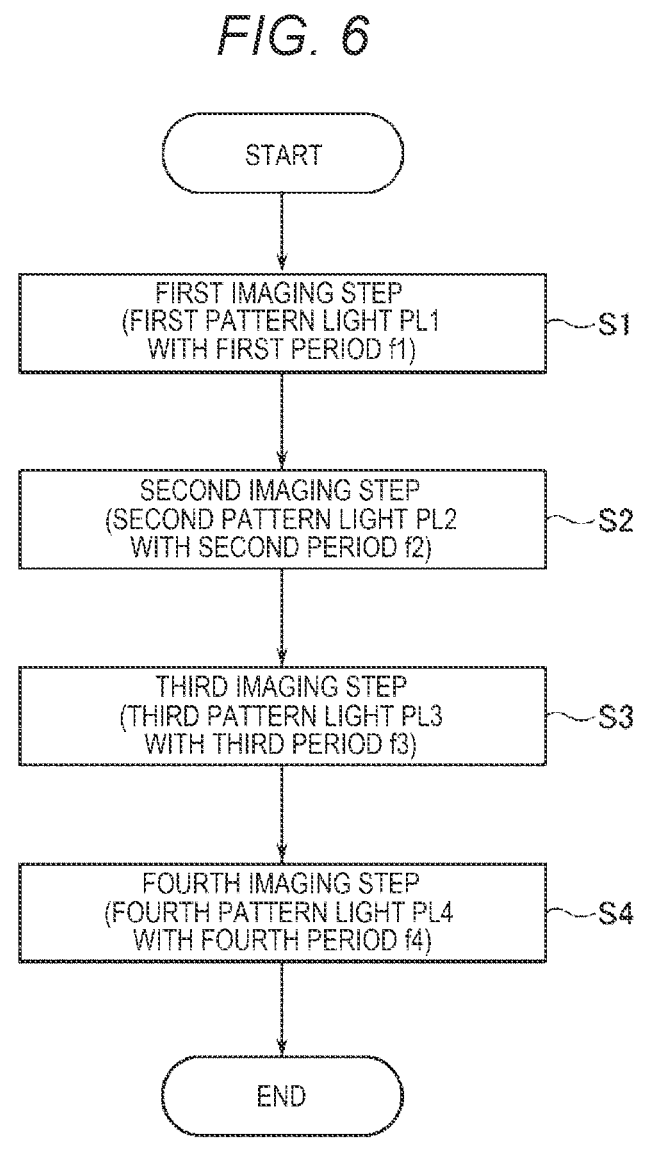

FIG. 6 is a flowchart for explanation of an example of a phase shift method.

DESCRIPTION OF EXEMPLARY EMBODIMENTS

As below, a distance measuring device and a robot according to the present disclosure will be explained in detail based on embodiments shown in the accompanying drawings.

1. First Embodiment

1.1. Configuration of Robot System

Figure 1:
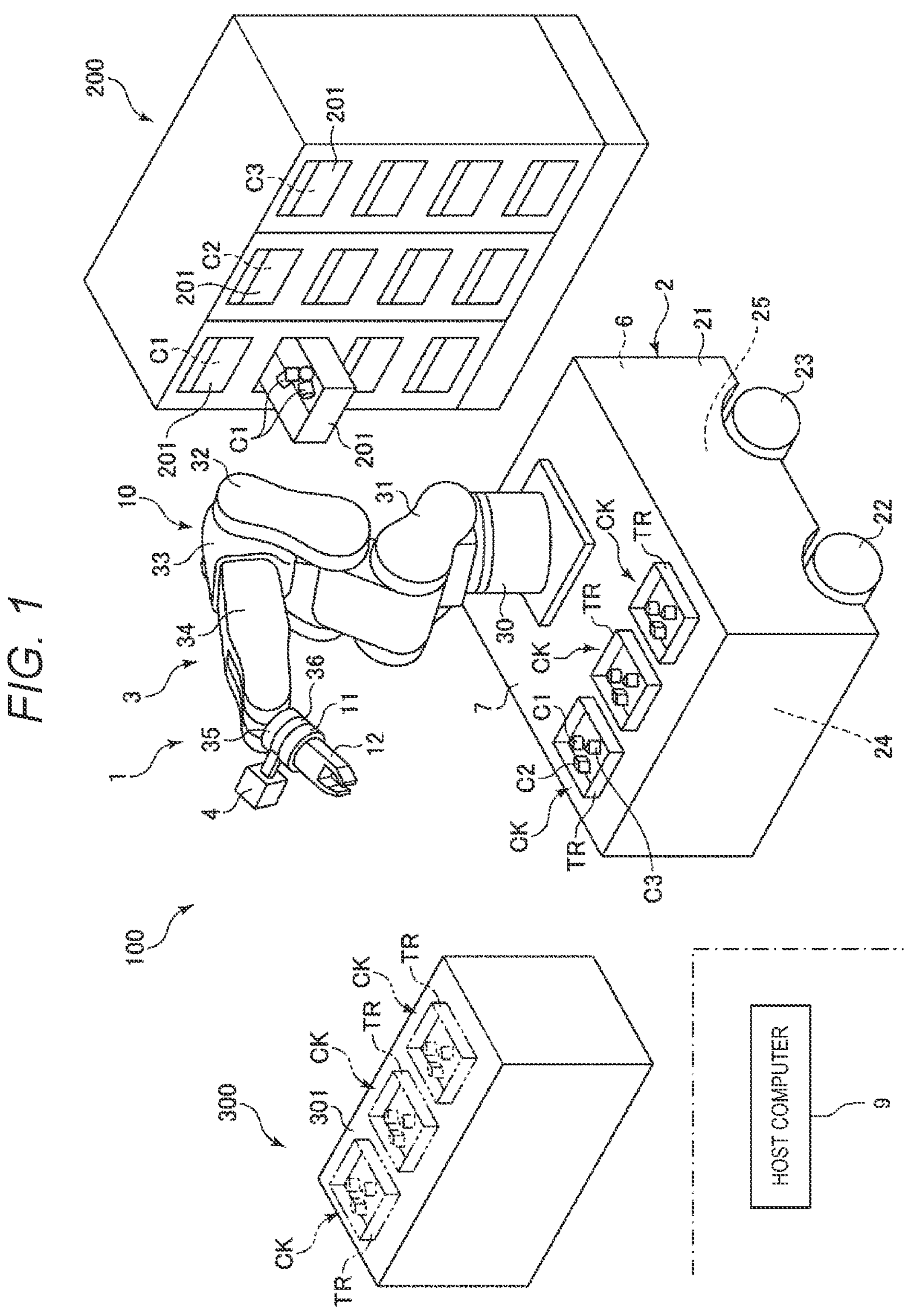
FIG. 1 is a perspective view schematically showing a robot system including a robot according to an embodiment.
Figure 2:
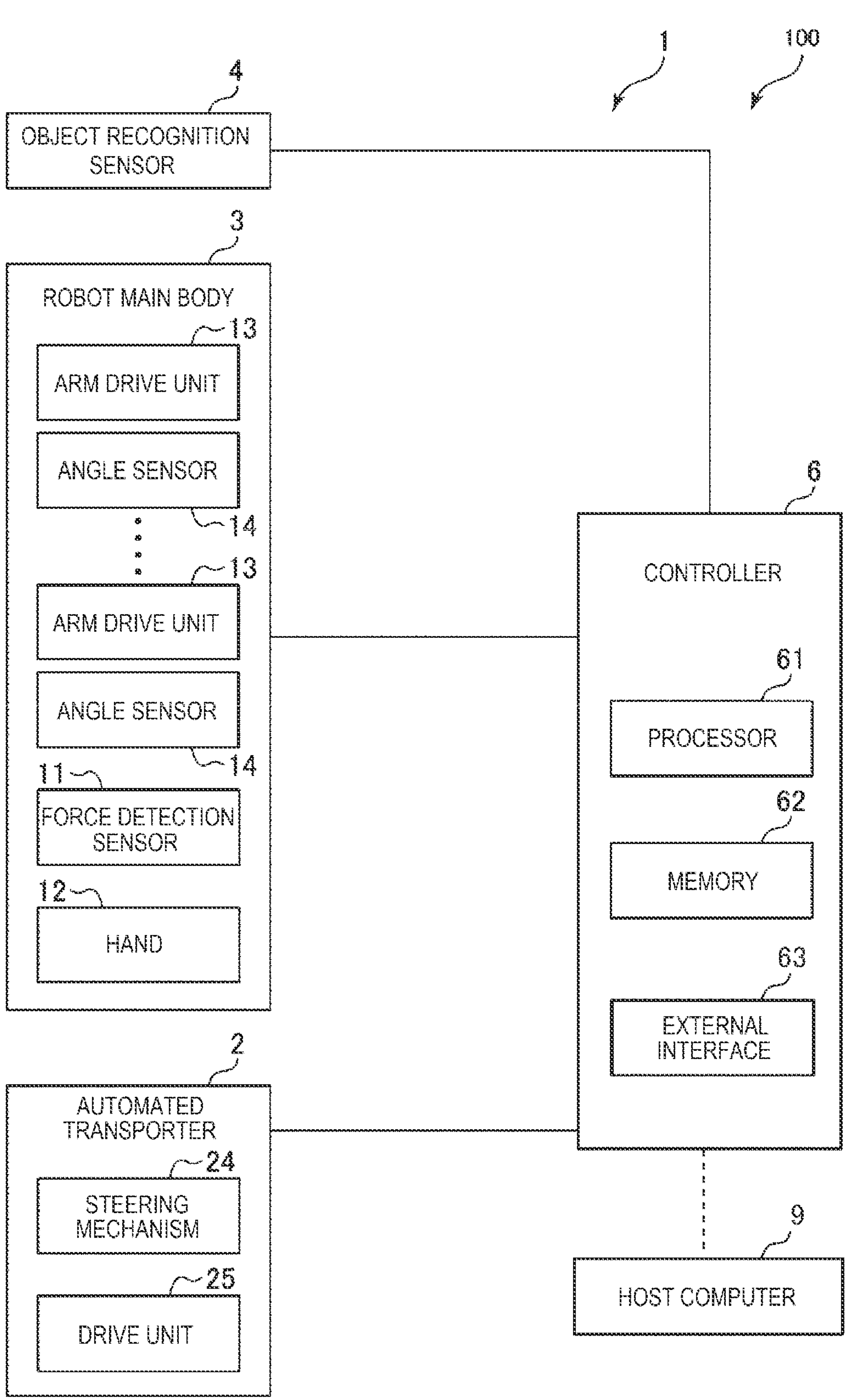
FIG. 2 is a block diagram showing a control system of the robot system shown in FIG. 1.
Figure 4:
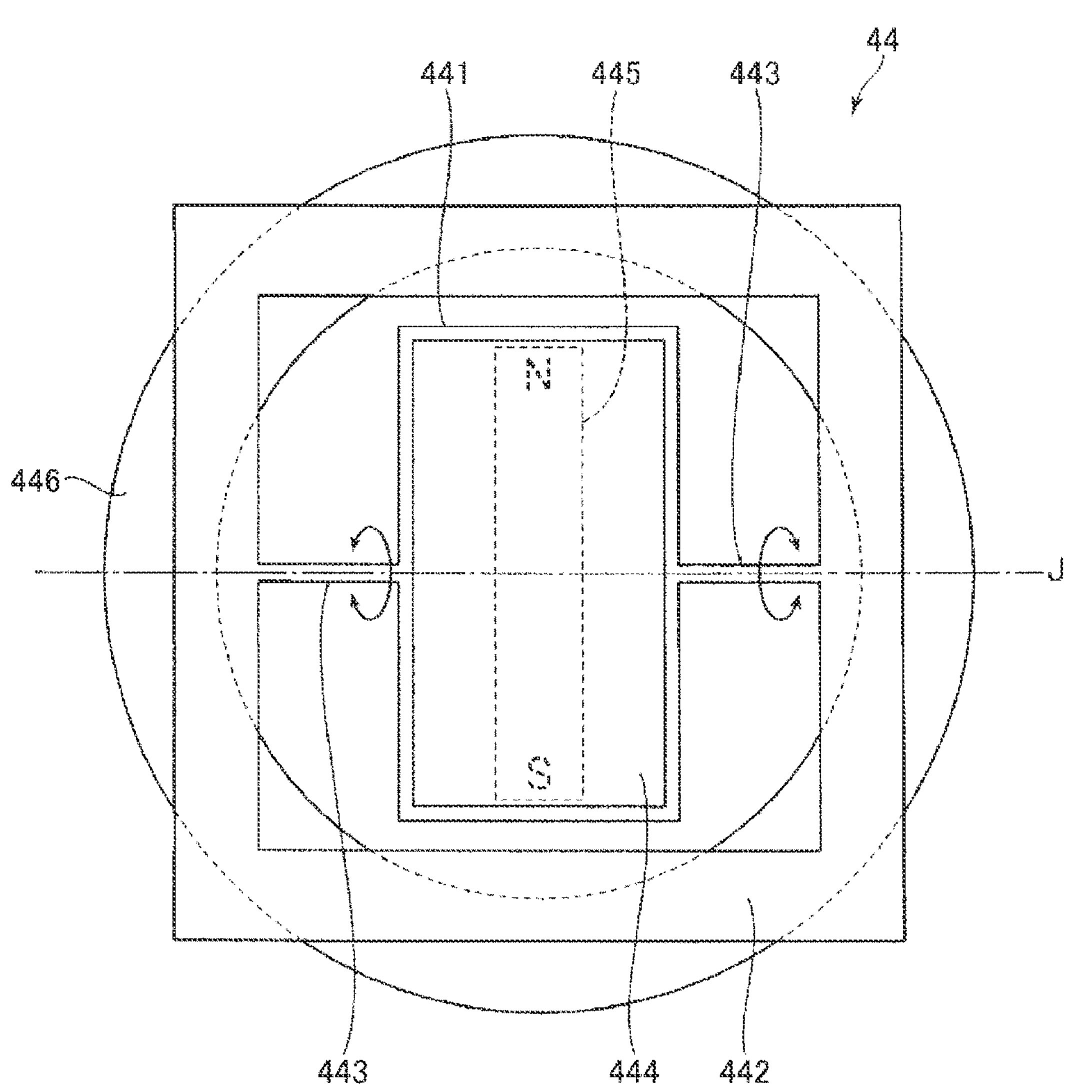
FIG. 4 is a plan view showing a light scanning unit of the object recognition sensor shown in FIG. 3.
Figure 5:
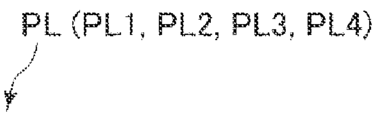
FIG. 5 is a plan view showing an example of a pattern light projected by the light scanning unit.
Figure 5:
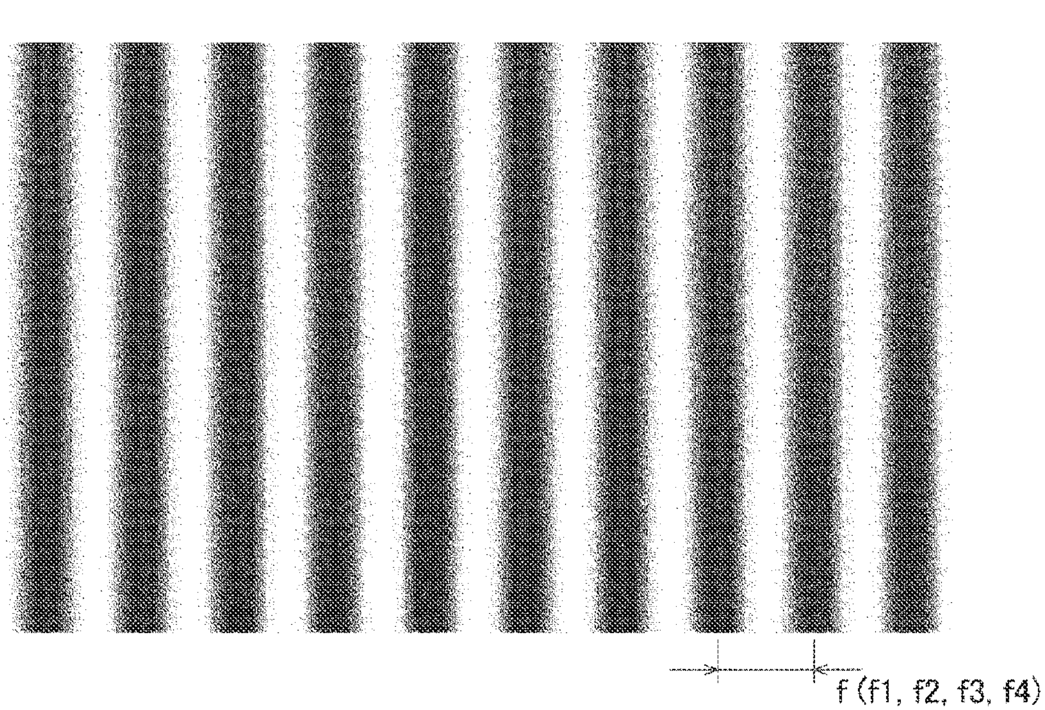
Figure 7:
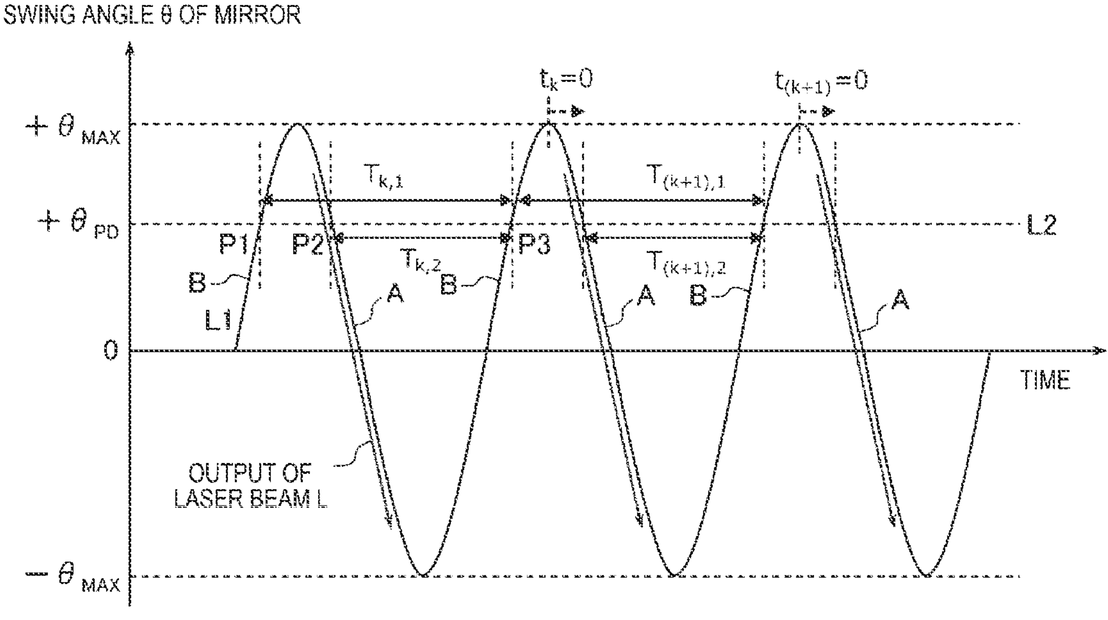
FIG. 7 is a timing chart showing drawing control of the pattern light by a drawing control part shown in FIG. 3.
Figure 8:
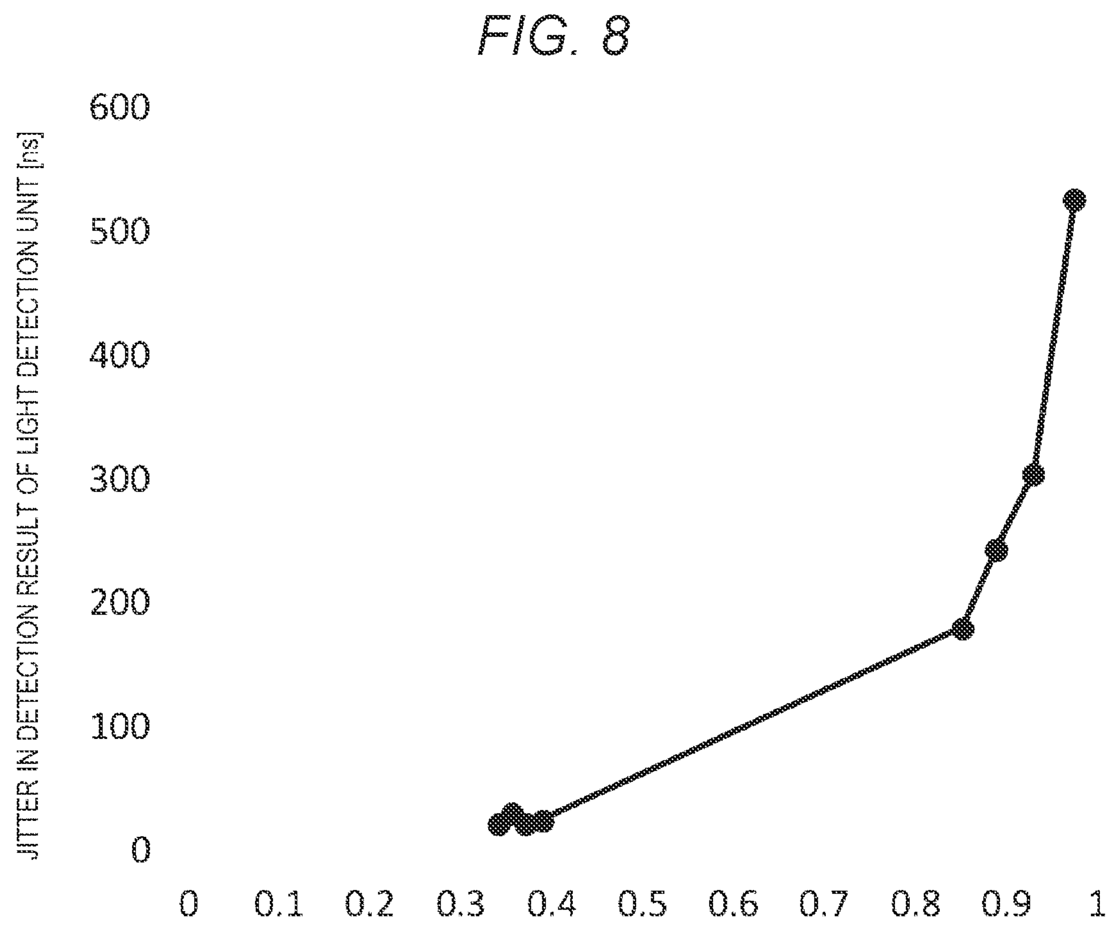
FIG. 8 is a graph showing a relationship between jitter contained in a detection result of a light detection unit and a ratio of a light detection unit placement angle $+\theta_{PD}$ to the maximum swing angle $+\theta_{MAX}$.
Figures 9, 10:
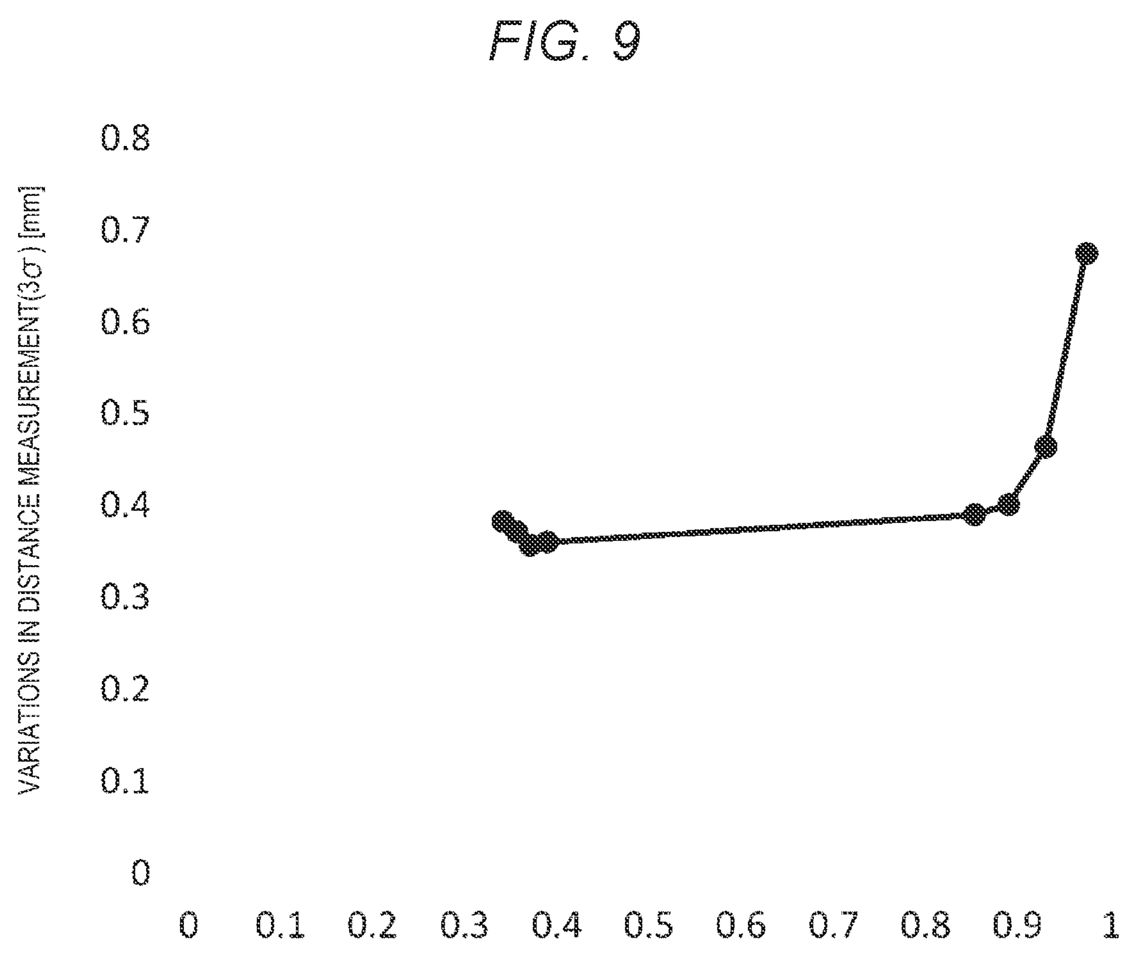
FIG. 9 is a graph showing a relationship between variations (3σ) in distance measurement and the ratio of the light detection unit placement angle $+\theta_{PD}$ to the maximum swing angle $+\theta_{MAX}$.
FIG. 10 shows an example of a drawing table generated by the drawing control part shown in FIG. 3.
Figure 11:
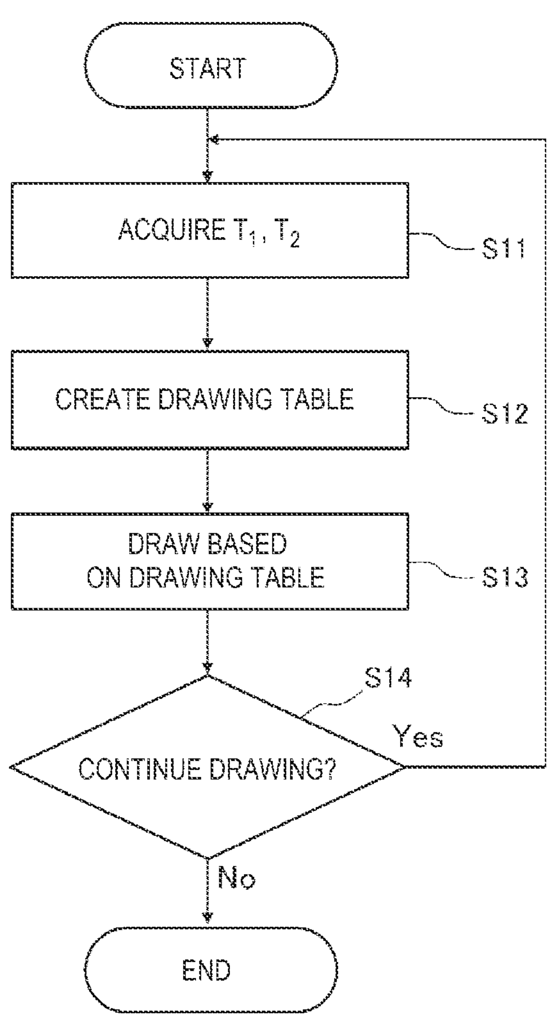
FIG. 11 is a flowchart for explanation of drawing processing of the pattern light by the drawing control part.

FIG. 1 is a perspective view schematically showing a robot system including a robot according to an embodiment. FIG. 2 is a block diagram showing a control system of the robot system shown in FIG. 1. FIG. 3 shows an overall configuration of an object recognition sensor shown in FIG. 2. FIG. 4 is a plan view showing a light scanning unit of the object recognition sensor shown in FIG. 3. FIG. 5 is a plan view showing an example of a pattern light projected by the light scanning unit. FIG. 6 is a flowchart for explanation of an example of a phase shift method. FIG. 7 is a timing chart showing drawing control of the pattern light by a drawing control part shown in FIG. 3. FIG. 8 is a graph showing a relationship between jitter contained in a detection result of a light detection unit and a ratio of a light detection unit placement angle $+\theta_{PD}$ to the maximum swing angle $+\theta_{MAX}$. FIG. 9 is a graph showing a relationship between variations (3σ) in distance measurement and the ratio of the light detection unit placement angle $+\theta_{PD}$ to the maximum swing angle $+\theta_{MAX}$. FIG. 10 shows an example of a drawing table generated by the drawing control part shown in FIG. 3. FIG. 11 is a flowchart for explanation of drawing processing of the pattern light by the drawing control part.

As an example, a robot system 100 shown in FIG. 1 is a system in which a robot 1 performs work to respectively take out a plurality of components C1, C2, C3 of different types from one another from a component housing unit 200, form a component kit CK including the plurality of kinds of components C1, C2, C3, and supply the component kit CK to a workbench 300 for the next process.

The component housing unit 200 is a component rack having twelve housing spaces partitioned in four rows in vertical directions and three columns in horizontal directions, and containers 201 are housed in the respective housing spaces. Each container 201 has a tray shape or a box shape opening upward. Of the component housing unit 200, in each container 201 in the left column in FIG. 1, a plurality of the components C1 are housed. Of the component housing unit 200, in each container 201 in the center column in FIG. 1, a plurality of the components C2 are housed. Of the component housing unit 200, in each container 201 in the right column in FIG. 1, a plurality of the components C3 are housed. The respective containers 201 are placed to be drawable from the component housing unit 200. Thereby, the components C1, C2, C3 may be easily taken out from the respective containers 201.

The components C1, C2, C3 are the components of the different types from one another. The components C1, C2, C3 are respectively not particularly limited, but include e.g. various electronic components. The component kit CK contains each one of the components C1, C2, C3.

The workbench 300 is a bench for work using the component kit CK. The illustrated workbench 300 has a mount part 301 on which a plurality of the component kits CK can be mounted. The work on the workbench 300 is not particularly limited, but includes e.g. assembly, painting, surface treatment, alignment, transport of component groups including the component kits CK.

The robot 1 includes an automated transporter 2, a robot main body 3 having a robot arm 10 mounted on the automated transporter 2, an object recognition sensor 4 (distance measuring device) placed in the robot arm 10, a controller 6 (control unit) that controls operation of the automated transporter 2 and the robot arm 10, and a mounting part 7 placed on the automated transporter 2. Further, the robot 1 shown in FIG. 1 is coupled to a host computer 9 by e.g. wireless communications or wired communications via a cable (not shown). Therefore, the robot system 100 is a system having the robot 1, the component housing unit 200, the workbench 300, and the host computer 9.

The controller 6 can move the automated transporter 2 to place the robot arm 10 in a position where the robot arm can perform work on the component housing unit 200 or the workbench 300. Further, when the robot main body 3 is in the position where the robot arm can perform work on the component housing unit 200, the controller 6 can drive the robot main body 3 to form a plurality of component kits CK on the mounting part 7 based on a recognition result of the object recognition sensor 4. Furthermore, when the robot main body 3 is in the position where the robot arm can perform work on the workbench 300, the controller 6 can drive the robot main body 3 to remount the plurality of component kits CK from the mounting part 7 onto the workbench 300 based on a recognition result of the object recognition sensor 4.

The host computer 9 outputs an instruction to control driving of the robot 1 to the controller 6 based on e.g. input from a user or outside.

As below, the respective units forming the robot system 100 will be sequentially explained.

1.2. Automated Transporter

The automated transporter 2 shown in FIG. 1 is a tracklessly movable automated guided vehicle. "Tracklessly movable" refers to movement controllable toward a designated destination position without need for equipment such as rails as movement tracks of the automated transporter 2 and guide wires for guidance. Note that the automated transporter 2 is not limited to that.

As shown in FIGS. 1 and 2, the automated transporter 2 includes a vehicle body 21, a pair of front wheels 22 attached to the vehicle body 21 on the front side as a side in a normal traveling direction, a pair of rear wheels 23 on the rear side, a steering mechanism 24 that can change steering angles of the pair of front wheels 22, and a drive unit 25 that can drive the pair of rear wheels 23.

As shown in FIG. 1, the mounting part 7 on which the plurality of component kits CK including the plurality of components C1, C2, C3 can be mounted is provided in the upper part of the vehicle body 21. The mounting part 7 is formed by mounting of the component kits CK on trays TR.

Further, a battery (not shown) for supplying electric power to the drive unit 25 is placed within the vehicle body 21, and the battery is also used for driving of the robot arm 10, the object recognition sensor 4, etc.

1.3. Robot Main Body

The robot main body 3 shown in FIG. 1 is the so-called single-arm 6-axis vertical articulated robot. The robot main body 3 has a base 30 and the robot arm 10 pivotably coupled to the base 30. A hand 12 is attached to the robot arm 10 via a force detection sensor 11.

The base 30 is fixed to the upper part of the vehicle body 21 of the above described automated transporter 2 by bolts or the like (not shown). Note that the base 30 may be integrated with the automated transporter 2.

The robot arm 10 has an arm 31 pivotably coupled to the base 30, an arm 32 pivotably coupled to the arm 31, an arm 33 pivotably coupled to the arm 32, an arm 34 pivotably coupled to the arm 33, an arm 35 pivotably coupled to the arm 34, and an arm 36 pivotably coupled to the arm 35.

Arm drive units 13 shown in FIG. 2 are provided in the respective joint portions of these arms 31 to 36, and the respective arms 31 to 36 pivot by driving of the respective arm drive units 13. Here, each arm drive unit 13 has a motor and a reducer (not shown). As the motor, e.g. a servo motor such as an AC servo motor or a DC servo motor, a piezoelectric motor, or the like may be used. As the reducer, e.g. a planet gear reducer, a wave gearing, or the like may be used. Further, in each arm drive unit 13, as shown in FIG. 2, an angle sensor 14 such as a rotary encoder is provided, and the angle sensor 14 detects the rotation angle of the rotation shaft of the motor or the reducer of the arm drive unit 13.

The force detection sensor 11 is e.g. a six-axis force sensor that can detect six axis components of an external force applied to the force detection sensor 11.

The hand 12 has two fingers that can respectively grip the components C1, C2, C3 as working objects of the robot system 100. Note that the number of fingers of the hand 12 is not limited to two, but may be three or more. Depending on the types of the components C1, C2, C3, an end effector that holds the components C1, C2, C3 by suction or the like may be used in place of the hand 12.

The configuration of the robot main body 3 is not limited to the above described configuration. For example, the number of arms of the robot arm 10 may be one to five, seven, or more. Alternatively, for example, the type of the robot main body 3 may be a scalar robot or a dual-arm robot having two robot arms 10.

1.4. Controller

The controller 6 shown in FIG. 2 has a function of controlling driving of the automated transporter 2 and the robot arm 10 based on a detection result of the angle sensor

14, a detection result of the force detection sensor 11, a recognition result of the object recognition sensor 4, etc.

The controller 6 includes a processor 61 such as a CPU (Central Processing Unit), a memory 62 such as a ROM (read only memory) or a RAM (random access memory), and an external interface 63. These are communicable with one another via an internal bus. Note that the controller 6 shown in FIG. 1 is placed within the vehicle main body 21 of the automated transporter 2, however, the placement of the controller 6 is not limited to that. For example, the controller may be placed within the base 30 of the robot main body 3, outside of the vehicle main body 21, or the like.

In the memory 62, a program for drive control of the automated transporter 2 and the robot arm 10, component shape information of the components C1, C2, C3 as working objects, and map information of an environment in which the robot system 100 is used are stored. Here, the map information contains position information and shape information of objects in the environment in which the robot system 100 is used e.g. the component housing unit 200, the workbench 300, etc.

The processor 61 appropriately reads and executes the program and various kinds of information stored in the memory 62, and thereby, performs the drive control of the automated transporter 2 and the robot arm 10.

The controller 6 generates a position command of the robot main body 3 from distance information of an object W calculated by a measuring unit 49 and controls the operation of the automated transporter 2 and the robot arm 10 based on the generated position command. Note that, in the embodiment, the controller 6 and the measuring unit 49 are separately formed, however, the controller 6 may include the function of the measuring unit 49.

Alternatively, the host computer 9 may include part or all of the function of the measuring unit 49 or part or all of the function of the controller 6.

1.5. Configuration of Object Recognition Sensor

The object recognition sensor 4 is provided in the distal end portion of the robot arm 10 of the above described robot main body 3. In the drawing, the object recognition sensor 4 is attached to the arm 36 at the most distal end side of the arms 31 to 36 of the robot arm 10. The object recognition sensor 4 has a function of outputting a signal according to a shape of an object located around or near the distal end portion of the robot arm 10, e.g. an object such as the components C1, C2, C3, the component housing unit 200, the workbench 300, or the mounting part 7.

Note that the placement position of the object recognition sensor 4 may be in the other arms 31 to 35, the base 30, the vehicle main body 21 of the automated transporter 2, or the like. Further, two or more object recognition sensors 4 may be placed.

For example, the object recognition sensor 4 is configured to measure a distance to an object located around or near the distal end portion of the robot arm 10 using a phase shift method and recognize the shape of the object based on the measurement result. Further, a three-dimensional orthogonal coordinate system for expressing the recognition result is set for the object recognition sensor 4, and the object recognition sensor 4 outputs coordinate information of the object in the coordinate system. The coordinate system set for the object recognition sensor 4 is correlated to a robot coordinate system set for the robot 1, i.e., the coordinate system used by the controller 6 for drive control of the robot 1 in the controller 6.

As shown in FIG. 3, the object recognition sensor 4 includes a projection section 40 that projects a pattern light PL formed by a laser beam L in a region containing the object W, a light detection unit 46 that receives a part of the laser beam L, an imaging unit 47 that acquires a captured image by imaging of the region containing the object W on which the pattern light PL is projected, a control unit 48 that controls driving of the projection section 40 and the imaging unit 47, the measuring unit 49 that measures a three-dimensional shape of the object W based on the captured image, and a housing 5 housing these units.

The projection section 40 and the imaging unit 47 are fixed to the arm 36 and the position relationship with each other is fixed. Thereby, the object recognition sensor 4 may constantly output the laser beam L toward around or near the distal end portion of the robot arm 10 and image the region.

Note that the placement of the projection section 40 and the imaging unit 47 is not particularly limited, but may be fixed to positions of the other member than the arm 36 of the robot arm 10.

The projection section 40 has a function of projecting a striped pattern light PL shown in FIG. 5 on the object W using the laser beam L. As shown in FIG. 3, the projection section 40 has a light output unit 41 that outputs a linear laser beam L, a light scanning unit 44 that scans the object W with the laser beam L, and the light detection unit 46 that detects the light reflected by a mirror 444. Further, the light output unit 41 has a laser beam source 42 that outputs the laser beam L and an optical system 43 including a plurality of lenses through which the laser beam L output from the laser beam source 42 passes.

The laser beam source 42 is not particularly limited, but e.g. a semiconductor laser such as a vertical cavity surface emitting laser (VCSEL) or vertical external cavity surface emitting laser (VECSEL) may be used. The optical system 43 has a collecting lens 431 that collects the laser beam L output from the laser beam source 42 to the vicinity of the object W, and a rod lens 432 that linearizes the laser beam L collected by the collecting lens 431 to be extended in a direction parallel to a swing axis J, which will be described later, i.e., a depth direction of FIG. 3. Note that, in the embodiment, the laser beam source 42 and the optical system 43 form the linear laser beam L, however, the configuration of the light output unit 41 is not particularly limited as long as the unit may form the linear laser beam L.

The light scanning unit 44 scans with the linear laser beam L. Thereby, the laser beam L may be two-dimensionally diffused and radiated. The light scanning unit 44 is not particularly limited, but e.g. an MEMS (Micro Electro Mechanical Systems), a galvano mirror, a polygon mirror, or the like may be used.

The MEMS is used for the light scanning unit 44 according to the embodiment. As shown in FIG. 4, the light scanning unit 44 has a movable portion 441, a supporting portion 442 supporting the movable portion 441, a beam portion 443 coupling the movable portion 441 and the supporting portion 442 so that the movable portion 441 can swing around the swing axis J relative to the supporting portion 442, the mirror 444 placed on a front surface of the movable portion 441 and reflecting the laser beam L, a permanent magnet 445 provided on a back surface of the movable portion 441, and a coil 446 placed to face the permanent magnet 445. The light scanning unit 44 is placed so that the swing axis J may be substantially aligned with the extension direction of the linear laser beam L. When a drive signal is applied to the coil 446, the movable portion 441 swings around the swing axis J alternately forward and backward with a predetermined period, and thereby, planar scanning with the linear laser beam L is performed.

As shown in FIG. 3, the light detection unit 46 is provided near the light scanning unit 44 and detects the light reflected by the mirror 444. The light may be another light than the laser beam L, but, in the embodiment, is a part of the laser beam L. The part of the laser beam L is captured by the light detection unit 46 while scanning by the light scanning unit 44. The light detection unit 46 receiving the light outputs a light reception signal to the control unit 48. In the control unit 48, the swing angle of the mirror 444 may be detected by conversion of the light reception signal into a digital signal and analysis of the signal. The light detection unit 46 is not particularly limited, but e.g. a photodiode, a phototransistor, or the like may be used.

The imaging unit 47 images a state in which the pattern light PL is projected on at least one object W. As shown in FIG. 3, the imaging unit 47 includes e.g. a camera 471 having an imaging device 472 such as a CMOS (Complementary Metal Oxide Semiconductor) image sensor or CCD (Charge Coupled Device) image sensor and a collecting lens 473. The camera 471 is coupled to the measuring unit 49 and transmits the captured image data to the measuring unit 49.

As shown in FIG. 3, the control unit 48 has a drawing control part 481, a light output control part 482, and a light scanning control part 483.

The drawing control part 481 controls the operation of the light output control part 482 and the light scanning control part 483 based on the light reception signal output from the light detection unit 46, and thereby, controls the operation of the projection section 40 and optimizes drawing of the pattern light PL. Specifically, for example, the pattern light PL having the striped pattern represented by large and small brightness values as shown in FIG. 5 is drawn. As shown in FIG. 5, the pattern light PL has the striped pattern in which a drawing range is divided into a plurality of areas in a predetermined direction and the brightness value is changed in the predetermined direction according to sine waves with respect to each area as one period. When the pattern light PL is drawn, the drive voltage applied to the laser beam source 42 is controlled so that intensity of the laser beam L may be predetermined intensity. Further, the part controls the operation of the imaging unit 47 to image the region containing the object W on which the pattern light PL is projected. Note that the drawing control part 481 may be configured to perform control not only based on the light reception signal output from the light detection unit 46 but also based on other information. The other information includes e.g. information on the intensity of the laser beam L.

The light output control part 482 outputs a control signal for controlling driving of the laser beam source 42 in synchronization with the swing of the mirror 444 so that the amount of light of the laser beam L may be a desired amount of light according to an instruction from the drawing control part 481.

The light scanning control part 483 outputs a control signal for controlling driving of the light scanning unit 44 so that the mirror 444 may swing with a predetermined period and at a predetermined swing angle according to an instruction from the drawing control part 481.

The control unit 48 includes e.g. a computer having a processor (CPU) that processes information, a memory communicably connected to the processor, and an external interface. In the memory, various programs that can be executed by the processor are stored. The processor reads and executes the various programs etc. stored in the memory. Thereby, various functions of the control unit 48 are realized.

Part or all of the functions of the control unit 48 may be realized by hardware including an LSI (Large Scale Integration), an ASIC (Application Specific Integrated Circuit), and an FPGA (Field-Programmable Gate Array) or realized by cooperation of software and hardware.

The object recognition sensor 4 shown in FIG. 3 includes a light source drive part 484 provided between the control unit 48 and the laser beam source 42. The light source drive part 484 is a driver that drives the laser beam source 42 based on the control signal output from the light output control part 482. The light source drive part 484 generates a modulation signal periodically changing in e.g. a waveform according to a sinusoidal waveform and outputs the signal as a drive signal to the laser beam source 42.

The object recognition sensor 4 shown in FIG. 3 includes a light scanning drive part 485 provided between the control unit 48 and the light scanning unit 44. The light scanning drive part 485 is a driver that drives the light scanning unit 44 based on the control signal output from the light scanning control part 483. The light scanning drive part 485 generates a modulation signal periodically changing in e.g. a sinusoidal waveform or a waveform according to a sinusoidal waveform and outputs the signal as a drive signal to the coil 446.

The housing 5 shown in FIG. 3 houses the projection section 40, the light detection unit 46, the imaging unit 47, the control unit 48, and the measuring unit 49. In the housing 5, a window portion (not shown) for outputting the laser beam L and imaging by the imaging unit 47 is provided.

Next, the phase shift method used for the distance measurement of the object W is explained. As shown in FIG. 6, the drawing control part 481 performs a first imaging step S1, a second imaging step S2, a third imaging step S3, and a fourth imaging step S4 to control the operation of the respective units. The first imaging step S1 controls the operation of the respective units to project a first pattern light PL1 having a first period f1 on the object W and image the region containing the object W with the first pattern light PL1 projected thereon using the camera 471. The second imaging step S2 controls the operation of the respective units to project a second pattern light PL2 having a second period f2 shorter than the first period f1 on the object W and image the region containing the object W with the second pattern light PL2 projected thereon using the camera 471. The third imaging step S3 controls the operation of the respective units to project a third pattern light PL3 having a third period f3 shorter than the second period f2 on the object W and image the region containing the object W with the third pattern light PL3 projected thereon using the camera 471. The fourth imaging step S4 controls the operation of the respective units to project a fourth pattern light PL4 having a fourth period f4 shorter than the third period f3 on the object W and image the region containing the object W with the fourth pattern light PL4 projected thereon using the camera 471.

As described above, the drawing control part 481 performs the distance measurement of the object W using "multi-period phase shift method" using a plurality of pattern lights PL having different periods f from one another of the phase shift methods. In the phase shift method, the longer the period f of the pattern light PL, the larger the measurement range and the lower the distance resolution. The shorter the period f of the pattern light PL, the smaller the measurement range and the higher the distance resolution. Accordingly, the multi-period phase shift method is used, and thereby, both the wider measurement range and the higher distance resolution may be realized. Note that the multi-period phase shift method is not particularly limited, but e.g. a method of measuring at a plurality of times with respect to each period of multiple periods or a method of measuring at different times with respect to each period of multiple periods may be used.

At the first imaging step S1, the drawing control part 481 controls the respective units to project the first pattern light PL1 on the object W at four times with phase shifts of $\pi/2$ and images a region containing the object W with the first pattern light PL1 projected thereon using the camera 471 at each time. The same applies to the second imaging step S2, the third imaging step S3, and the fourth imaging step S4.

The measuring unit 49 performs calculation necessary for the distance measurement to the object W based on a plurality of pieces of image data acquired by the imaging unit 47 from the first imaging step S1 to the fourth imaging step S4. Specifically, the measuring unit 49 calculates the plurality of pieces of image data and obtains distance information including the posture and the position (spatial coordinates) of the object W. Then, the measuring unit 49 transmits the obtained distance information of the object W to the host computer 9.

As above, the phase shift method is explained, however, the method is not limited to the above described method. For example, the second imaging step S2 and the subsequent steps may be omitted. On the other hand, a fifth imaging step S5, a sixth imaging step S6, and more steps may be added. As the steps are increased, the measurement range may be enlarged and the distance resolution may be increased, however, the time taken for acquiring the captured images increases as the number of imaging times increases and the operation efficiency of the robot 1 becomes lower. Accordingly, the number of steps may be appropriately set with balance between the accuracy and measurement range of the distance measurement and the operation efficiency of the robot 1.

At the first imaging step S1, the number of times of projection of the first pattern light PL1 with phase shifts is not particularly limited to the four times as long as the phase may be calculated from the imaging results. As the number is increased, the phase may be calculated more accurately, however, the time taken for acquiring the captured images increases as the number of imaging times by the camera 471 increases and the operation efficiency of the robot 1 becomes lower. Accordingly, the number of imaging times of the first pattern light PL1 may be appropriately set with balance between the accuracy of the distance measurement and the operation efficiency of the robot 1. The same applies to the second imaging step S2, the third imaging step S3, and the fourth imaging step S4. Note that the shape or the like of the pattern light PL is not particularly limited as long as the light may be used for the phase shift method.

1.6. Operation of Object Recognition Sensor

Next, the operation of the object recognition sensor 4 as the distance measuring device according to the embodiment will be explained.

In the above described robot system 100, first, the robot arm 10 is set in a posture for distance measurement of the object W, then, with the robot arm 10 being stationary in the posture, driving of the light scanning unit 44 is started and the movable portion 441 is swung around the swing axis J, and subsequently, the laser beam L is output from the laser beam source 42 and the pattern light PL is projected on the object W. Then, the region containing the object W with the pattern light PL projected thereon is imaged using the camera 471, and thereby, the distance measurement of the object W is performed.

As described above, the mirror 444 swings around the swing axis J. Accordingly, as shown in FIG. 7, the swing of the mirror 444 includes a forward path toward one side around the swing axis J and a backward path toward the opposite side to the forward path. In FIG. 7, a stroke to pivot in a direction in which the swing angle of the mirror 444 decreases is referred to as “forward path A” and a stroke to pivot in the opposite direction is referred to as “backward path B”. In the embodiment, the drawing control part 481 controls the respective units to output the laser beam L from the laser beam source 42 when the swing angle θ of the mirror 444 is in the forward path A and not to output the laser beam L from the laser beam source 42 when the swing angle θ of the mirror 444 is in the backward path B. That is, the drawing control part 481 controls the driving of the respective units to perform “one-way drawing” to scan with the laser beam L only in the forward path. Note that, in FIG. 7, the stroke to pivot in the direction in which the swing angle θ decreases is the forward path A and the stroke to pivot in the direction in which the swing angle θ increases is the backward path B, however, the relationship may be inverse. Alternatively, the drawing control part 481 may control the driving of the respective units to perform “two-way drawing” to scan with the laser beam L in both the forward path A and the backward path B.

FIG. 7 is a graph showing changes of the swing angle θ with time when the center of a swing width (swing center) of the mirror 444 is the swing angle θ=0. The swing angle θ refers to an angle formed by an optical path of the laser beam L reflected by the mirror 444 at the swing center and an optical path of the laser beam L reflected by the mirror 444 at another angle than that at the swing center and may take positive and negative values. In FIG. 7, the maximum value of the swing angle θ at the plus side is the maximum swing angle $+\theta_{MAX}$, and the minimum value of the swing angle θ at the minus side is the minimum swing angle $-\theta_{MAX}$.

When scanning with the laser beam L is performed by changing the swing angle θ of the mirror 444 with the period as shown in FIG. 7, the above described light detection unit 46 is placed in a position within the scanning range. Thereby, the light detection unit 46 may receive a part of the laser beam L when the mirror 444 is at a predetermined angle, which will be described later.

The drawing control part 481 controls the respective units not to output the laser beam L at both ends of the forward path A, i.e., near the maximum swing angle $+\theta_{MAX}$ and near the minimum swing angle $-\theta_{MAX}$ in FIG. 7. In this regions, the swing speed of the mirror 444 is significantly low and unsuitable for scanning with the laser beam L. The laser beam L is not output in the locations, and thereby, the clearer pattern light PL may be formed. Note that the drawing control part 481 is not limited to that, but may control the respective units to output the laser beam L near the maximum swing angle $+\theta_{MAX}$ and near the minimum swing angle $-\theta_{MAX}$.

In FIG. 7, the light detection unit 46 is placed to receive a part of the laser beam L when the swing angle θ of the mirror 444 is $+\theta_{PD}$. The $+\theta_{PD}$ is referred to as “light detection unit placement angle”. It is necessary that the light detection unit placement angle $+\theta_{PD}$ is the swing angle at which a part of the laser beam L may be received, and the light detection unit placement angle is smaller than the swing angle when the output of the laser beam L is started.

On the other hand, in view of the detection result of the light detection unit 46, it is necessary to consider an optimal angle as the light detection unit placement angle $+\theta_{PD}$. If the light detection unit placement angle $+\theta_{PD}$ is too close to the maximum swing angle $+\theta_{MAX}$, the laser beam L reflected at the significantly low swing speed of the mirror 444 is received by the light detection unit 46. In this case, the laser beam L received by the light detection unit 46 has a temporally long width and a blunt peak appears in the light reception signal. Thereby, phase fluctuations called jitter occur in the digital signal converted from the light reception signal. When the detection result of the light detection unit 46 contains jitter, accuracy is lower in the control of driving of the laser beam source 42 and the light scanning unit 44 based on the detection result. As a result, drawing reproducibility of the pattern light PL becomes lower and reduction in distance measurement accuracy in the object recognition sensor 4 is caused.

Accordingly, in the embodiment, the light detection unit placement angle $+\theta_{PD}$ is set to be equal to or less than 90% of the maximum swing amplitude of the mirror 444. The maximum swing amplitude refers to an angle width from the swing angle $\theta=0$ to the maximum swing angle $+\theta_{MAX}$ or the minimum swing angle $-\theta_{MAX}$. Therefore, the light detection unit placement angle being equal to or less than 90% of the maximum swing amplitude is that the angle width from the swing angle $\theta$ to the light detection unit placement angle $+\theta_{PD}$ is equal to or less than 90% of the angle width from the swing angle $\theta$ to the maximum swing angle $+\theta_{MAX}$ or the minimum swing angle $-\theta_{MAX}$. That is, a relationship $|\pm\theta_{PD}|\leq 0.90\times|\pm\theta_{MAX}|$ holds.

The light detection unit 46 is provided in the position, and thereby, a part of the laser beam L reflected at a sufficiently high swing speed of the mirror 444 may be received. Accordingly, jitter in the detection result of the light detection unit 46 may be suppressed. As a result, drawing reproducibility of the pattern light PL may be increased and distance measurement accuracy in the object recognition sensor 4 may be increased.

FIG. 8 is a graph showing a relationship between jitter contained in the detection result of the light detection unit 46 and a ratio of the light detection unit placement angle $+\theta_{PD}$ to the maximum swing angle $+\theta_{MAX}$. FIG. 9 is a graph showing a relationship between variations ($3\sigma$) in distance measurement and the ratio of the light detection unit placement angle $+\theta_{PD}$ to the maximum swing angle $+\theta_{MAX}$. Note that the variations in distance measurement refers to a triple value ($3\sigma$) of the standard deviation $\sigma$ of measurement results when the same distance is repeatedly measured.

As shown in FIG. 8, the jitter contained in the detection result of the light detection unit 46 largely decreases when the ratio of the light detection unit placement angle $+\theta_{PD}$ to the maximum swing angle $+\theta_{MAX}$ is equal to or less than 90%. Further, as shown in FIG. 9, similarly, the variations ($3\sigma$) in distance measurement largely decreases when the ratio of the light detection unit placement angle $+\theta_{PD}$ to the maximum swing angle $+\theta_{MAX}$ is equal to or less than 90%.

The graph shown in FIG. 8 does not contain jitter data in a range less than 35% of the ratio of the light detection unit placement angle $+\theta_{PD}$ to the maximum swing angle $+\theta_{MAX}$. However, in view of the principle of occurrence of jitter, it is estimated that the jitter in the range less than 35% is highly likely to be equal to or less than the value at 35%.

Similarly, the graph shown in FIG. 9 does not contain data of variations in distance measurement in the range less than 35% of the ratio of the light detection unit placement angle $+\theta_{PD}$ to the maximum swing angle $+\theta_{MAX}$. However, in consideration of a fact that jitter affects repeated measurement accuracy, it is estimated that the variations ($3\sigma$) in distance measurement in the range less than 35% are highly likely to be equal to or less than the value at 35%.

Therefore, when the ratio of the light detection unit placement angle $+\theta_{PD}$ to the maximum swing angle $+\theta_{MAX}$ is equal to or less than 90%, that is, the position of the light detection unit 46 is a position equal to or less than 90% of the maximum swing amplitude of the mirror 444, the drawing reproducibility of the pattern light PL may be increased and the distance measurement accuracy in the object recognition sensor 4 may be increased.

As described above, the object recognition sensor as the distance measuring device according to the embodiment has the light output unit 41, the light scanning unit 44, the light detection unit 46, the imaging unit 47, the measuring unit 49, and the control unit 48. The light output unit 41 outputs the linear laser beam L, the light scanning unit 44 includes the mirror 444 reflecting the laser beam L from the light output unit 41 while swinging and generates the pattern light PL on the object W. The light detection unit 46 is placed in the position equal to or less than 90% of the maximum swing amplitude of the mirror 444 and receives the light reflected by the mirror 444 and outputs the light reception signal. The imaging unit 47 images the generated pattern light PL, and the measuring unit 49 measures the distance to the object W based on the result imaged by the imaging unit 47. Further, the control unit 48 controls the generation of the pattern light PL based on the light reception signal output by the light detection unit 46.

According to the configuration, jitter contained in the detection result of the light detection unit 46 is suppressed, and the drawing reproducibility of the pattern light PL may be increased in the generation of the pattern light PL by the control unit 48. Thereby, the distance measurement accuracy in the object recognition sensor 4 may be increased. Note that, in FIGS. 8 and 9, the light detection unit placement angle is at the plus side, however, the light detection unit placement angle may be at the minus side.

Further, the above described robot 1 includes the object recognition sensor 4 (distance measuring device). Thereby, recognition accuracy of an object by the robot 1 is increased and efficiency of work to grip an object using the hand 12 and hold an object using the end effector is increased. That is, working efficiency by the robot 1 may be increased.

The light detection unit 46 is preferably placed in a position from 10% to 90% of the maximum swing amplitude and more preferably placed in a position from 35% to 90% thereof. That is, in the graphs shown in FIGS. 8 and 9, the ratio of the light detection unit placement angle $+\theta_{PD}$ to the maximum swing angle $+\theta_{MAX}$ is preferably from 10% to 90% and more preferably from 35% to 90%. In this case, a relationship $0.10\times|\pm\theta_{MAX}|\leq|\pm\theta_{PD}|\leq 0.90\times|\pm\theta_{MAX}|$ preferably holds and $0.35\times|\pm\theta_{MAX}|\leq|\pm\theta_{PD}|\leq 0.90\times|\pm\theta_{MAX}|$ more preferably holds.

When the ratio is less than the above described lower limit value, the placement of the light detection unit 46 is near the optical path of the laser beam L reflected by the mirror 444 at the swing center. The position is a position that may sufficiently exert the effect of suppressing jitter of the light reception signal, but not much suitable as the spatial placement of the light detection unit 46. That is, this position is highly likely to be a position close to a line connecting the light scanning unit 44 and the object W and, when the light detection unit 46 is placed in the position, the unit may be more likely to affect generation of the pattern light PL. In the viewpoint, it is desirable that the position of the light detection unit 46 is equal to or more than the lower limit value. When the timing of the laser beam L is changed to avoid the light detection unit 46 provided in that position, the region in which the pattern light PL may be generated may be smaller.

Further, the light detection unit 46 is preferably placed in a position from 80% to 90% of the maximum swing amplitude. That is, in the graphs shown in FIGS. 8 and 9, the ratio of the light detection unit placement angle $+\theta_{PD}$ to the maximum swing angle $+\theta_{MAX}$ is preferably from 80% to 90%.

The light detection unit 46 is placed in the position, and thereby, jitter contained in the detection result of the light detection unit 46 may be suppressed to be sufficiently small while the region in which the pattern light PL is generated is secured to be sufficiently large.

Next, drive control of the projection section 40 by the control unit 48 of the object recognition sensor 4 will be explained.

As described above, the mirror 444 swings with the predetermined period and, as shown in FIG. 7, the changes of the swing angle θ with time of the mirror 444 satisfy the sinusoidal waveform or the waveform according to a sinusoidal waveform. In FIG. 7, for convenience of illustration, as an example, the light detection unit placement angle $+\theta_{PD}$ is set to about 60% of the maximum swing angle $+\theta_{MAX}$. The light detection unit 46 outputs the light reception signal at the time when the swing angle θ coincides with the light detection unit placement angle $+\theta_{PD}$. Therefore, a time at an intersection point between a solid line L1 expressing the changes of the swing angle θ with time of the mirror 444 and a broken line L2 expressing the light detection unit placement angle $+\theta_{PD}$ may be acquired based on the detection result of the light detection unit 46.

In FIG. 7, time axes $t_k$, $t_{(k+1)}$, . . . on which times are respectively zero when the swing angle θ of the mirror 444 is the maximum swing angle $+\theta_{MAX}$ are set.

For example, it may be considered that there are three intersection points P1, P2, P3 on the time axis $t_k$ before the time 0. Of the points, the two intersection points P1, P3 are intersection points between the backward path B and the broken line L2, and the other intersection point P2 is located between the above described two intersection points P1, P3. Accordingly, in the control unit 48, time $T_{k,1}$ and time $T_{k,2}$ shown in FIG. 7 may be calculated based on the times at these intersection points P1, P2, P3 and reference times (clock pulses) internally generated by the control unit 48. The time $T_{k,1}$ is a time from the intersection point P1 to the intersection point P3 and the time $T_{k,2}$ is a time from the intersection point P2 to the intersection point P3.

These time $T_{k,1}$ and time $T_{k,2}$ are values derived from the solid line L1 expressing the changes of the swing angle θ with time of the mirror 444 and observation results of the swing of the mirror 444. Therefore, the time $T_{k,1}$ and the time $T_{k,2}$ on the time axis $t_k$ are calculated, and thereby, the times at the intersection points P1, P2, P3 on the next time axis $t_{(k+1)}$ may be expected. Using the expectation, the control unit 48 may control output times and output change times of the laser beam L on the next time axis $t_{(k+1)}$.

Specifically, the light detection unit placement angle $+\theta_{PD}$ is known, and the light detection unit placement angle $+\theta_{PD}$ and the time $T_{k,1}$ and time $T_{k,2}$ may be correlated. Then, using the time $T_{k,1}$ and the time $T_{k,2}$ and the maximum swing angle $+\theta_{MAX}$ and the minimum swing angle $-\theta_{MAX}$, a relationship between the swing angle θ and the time t on the time axis $t_k$ may be derived. Using the relationship, a drawing table showing the relationship between the swing angle θ and the time may be created with respect to the next time axis $t_{(k+1)}$ to the time axis $t_k$.

In a drawing table shown in FIG. 10, relationships between swing angles $\theta_1, \theta_2, \theta_3, \ldots, \theta_N$ and times $t_{(k+1),1}$, $t_{(k+1),2}$, $t_{(k+1),3}$, . . . , $t_{(k+1),N}$ on the time axis $t_{(k+1)}$ are specified. Here, N is a natural number and appropriately set according to the number of division of the angle width between the maximum swing angle $+\theta_{MAX}$ and the minimum swing angle $-\theta_{MAX}$.

Further, in the drawing table shown in FIG. 10, not only the swing angles θ and the times on the time axis $t_{(k+1)}$ but also LD values as indexes indicating the output of the laser beam L are correlated.

Specifically, the output start time and the output end time of the laser beam L are specified based on the swing angle θ, and the output start time and the output end time of the laser beam L on the time axis $t_{(k+1)}$ may be derived by correction of the LD values in the drawing table.

Further, the output change time of the laser beam L is specified based on the swing angle θ, and the output change time of the laser beam L on the time axis $t_{(k+1)}$ may be derived by correlation of the LD values in the drawing table.

Using the drawing table created in the above described manner, the drawing control part 481 enables generation of the pattern light PL with higher drawing reproducibility for the immediately preceding time axis $t_k$ on the time axis $t_{(k+1)}$. Thereby, the difference between the pattern light PL drawn on the time axis $t_k$ and the pattern light PL drawn on the time axis $t_{(k+1)}$ may be suppressed and the pattern light PL with which high-accuracy distance measurement may be performed may be drawn.

Note that, in the drawing table, the LD value is written as a value quantitatively expressing the output of the laser beam L including zero, however, the value may be another quantity.

Further, the drawing control part 481 repeats the above described control with respect to each new time axis. Then, the part updates the drawing table with respect to each new time axis. Thereby, the drawing table may be updated based on the immediately preceding observation result, and the difference between the swing angle θ and the time in the drawing table may be minimized. As a result, the pattern light PL with higher drawing reproducibility may be generated.

Note that the updating of the drawing table is preferably performed based on the observation result on the time axis $t_k$ immediately preceding the time axis $t_{(k+1)}$, however, may be performed based on the observation result on the further preceding time axis as necessary.

The drawing control part 481 strictly controls the output of the laser beam L on the time axis $t_{(k+1)}$ based on the drawing table. Therefore, it is necessary that the light scanning unit 44 swinging the mirror 444 reflecting the laser beam L stably swings the mirror 444.

Accordingly, in the embodiment, the light scanning unit 44 includes the permanent magnet 445 provided on the back surface of the movable portion 441 and the coil 446 placed to face the permanent magnet 445 as a mirror drive portion driving the mirror 444. The frequency at which the mirror drive portion drives the mirror 444 is not particularly limited, but is preferably different from the resonance frequency of the mirror 444. Thereby, resonance of the mirror 444 may be reduced and the mirror 444 may be stably driven. Note that the resonance frequency of the mirror 444 refers to the resonance frequency of the vibration system including the mirror 444.

The drive signal output by the light scanning drive part 485 has a sinusoidal waveform as an example. In this case, the drive signal may have the only one frequency component, not containing the frequency component to resonate the mirror 444, and, particularly, the mirror 444 may be stably driven.

The object recognition sensor 4 shown in FIG. 3 has the housing 5. It is only necessary for the housing 5 to house the light output unit 41 and the light scanning unit 44, however, in the embodiment, the light detection unit 46 is also provided within the housing 5.

According to the configuration, compared to a case where the light detection unit 46 is provided outside of the housing 5, the structure of the object recognition sensor 4 may be simpler and the placement may be easier. Note that, even when the light detection unit 46 is provided outside of the housing 5, the position of the light detection unit 46 may be set to a position where the light detection unit placement angle $+\theta_{PD}$ is equal to or less than 90% of the maximum swing amplitude of the mirror 444.

Further, as described above, in the embodiment, the laser beam L reflected by the mirror 444 is used as the light received by the light detection unit 46. A part of the laser beam L is received by the light detection unit 46, and thereby, preparation of another light source than the laser beam source 42 is not necessary and the object recognition sensor 4 may be downsized and the structure thereof may be simplified.

FIG. 11 is a flowchart for explanation of drawing processing of the pattern light PL by the drawing control part 481 described as above.

At step S11 in FIG. 11, first, time $T_1$ and time $T_2$ on the time axis t are acquired.

At step S12, a drawing table showing a relationship between time $T_1$ and time $T_2$ on the next time axis t and the swing angle $\theta$ is created based on the time $T_1$ and time $T_2$.

At step S13, the pattern light PL on the next time axis t is drawn based on the created drawing table.

At step S14, whether or not to continue drawing is determined. When the drawing is continued, the flow returns to step S11. When the drawing is not continued, the flow is ended.

2. Second Embodiment

Next, an object recognition sensor 4A as a distance measuring device according to a second embodiment will be explained.

Figure 12:
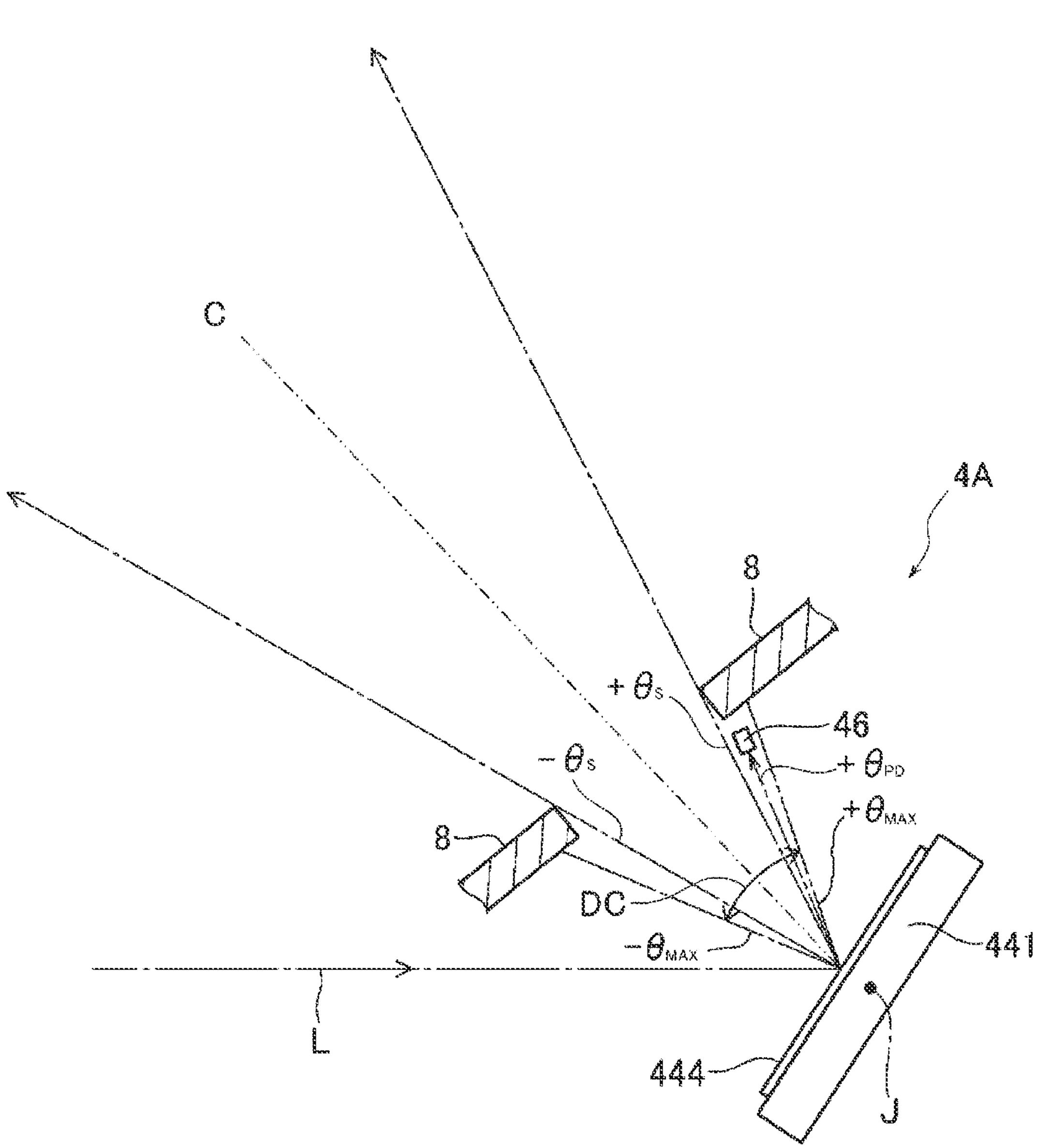
FIG. 12 is a partially enlarged view showing an object recognition sensor as a distance measuring device according to a second embodiment.

FIG. 12 is a partially enlarged view showing the object recognition sensor 4A as the distance measuring device according to the second embodiment.

As below, the second embodiment will be explained with a focus on the differences from the first embodiment and the explanation of the same items will be omitted. In FIG. 12, the same configurations as those of the above described embodiment have the same signs.

The second embodiment is the same as the first embodiment except that shielding portions 8 that restrict the scanning range of the laser beam L reflected by the mirror 444 are added. In FIG. 12, directions in which the light scanning unit 44 swings are referred to as "swing directions DC" and the center of the swing width in the swing directions DC is referred to as "swing center C".

The shielding portions 8 shown in FIG. 12 have a function of shielding a part of the laser beam L reflected by the mirror 444. Specifically, the shielding portions 8 have a function of shielding at least the laser beam L reflected when the swing angle $\theta$ of the mirror 444 is the light detection unit placement angle $+\theta_{PD}$. In other words, the shielding portions 8 pass the laser beam L reflected at the swing angle $\theta$ near the swing center C and shields the laser beam L reflected at the swing angle $\theta$ apart from the swing center C.

The shielding portions 8 are provided, and thereby, an influence by a shadow of the light detection unit 46 on the pattern light PL is prevented. That is, the shielding portions 8 are provided, and thereby, the pattern light PL may be generated using only the laser beam L not affected by the light detection unit 46. Therefore, the pattern light PL with higher drawing accuracy may be generated.

The shielding portions 8 shield the laser beam L reflected when the swing angle $\theta$ of the mirror 444 is between a shield swing angle $+\theta_S$ smaller than the light detection unit placement angle $+\theta_{PD}$ and the maximum swing angle $+\theta_{MAX}$ in FIG. 12. Therefore, in the embodiment, a relationship $0<|\pm\theta_S|<|\pm\theta_{PD}|\leq 0.9\times|\pm\theta_{MAX}|$ holds.

As described above, in the embodiment, the swing angle $\theta$ of the mirror 444 when the laser beam L reflected by the mirror 444 is received by the light detection unit 46 is set to the light detection unit placement angle $+\theta_{PD}$. Further, the object recognition sensor 4A according to the embodiment has the shielding portions 8 that shield the laser beam L reflected by the mirror 444 when the swing angle $\theta$ of the mirror 444 is the light detection unit placement angle $+\theta_{PD}$.

According to the configuration, the influence by the shadow of the light detection unit 46 on the pattern light PL is prevented, and thereby, the pattern light PL with higher drawing accuracy may be generated.

In the above described second embodiment, the same effects as those of the first embodiment may be obtained.

3. Third Embodiment

Next, an object recognition sensor 4B as a distance measuring device according to a third embodiment will be explained.

Figure 13:
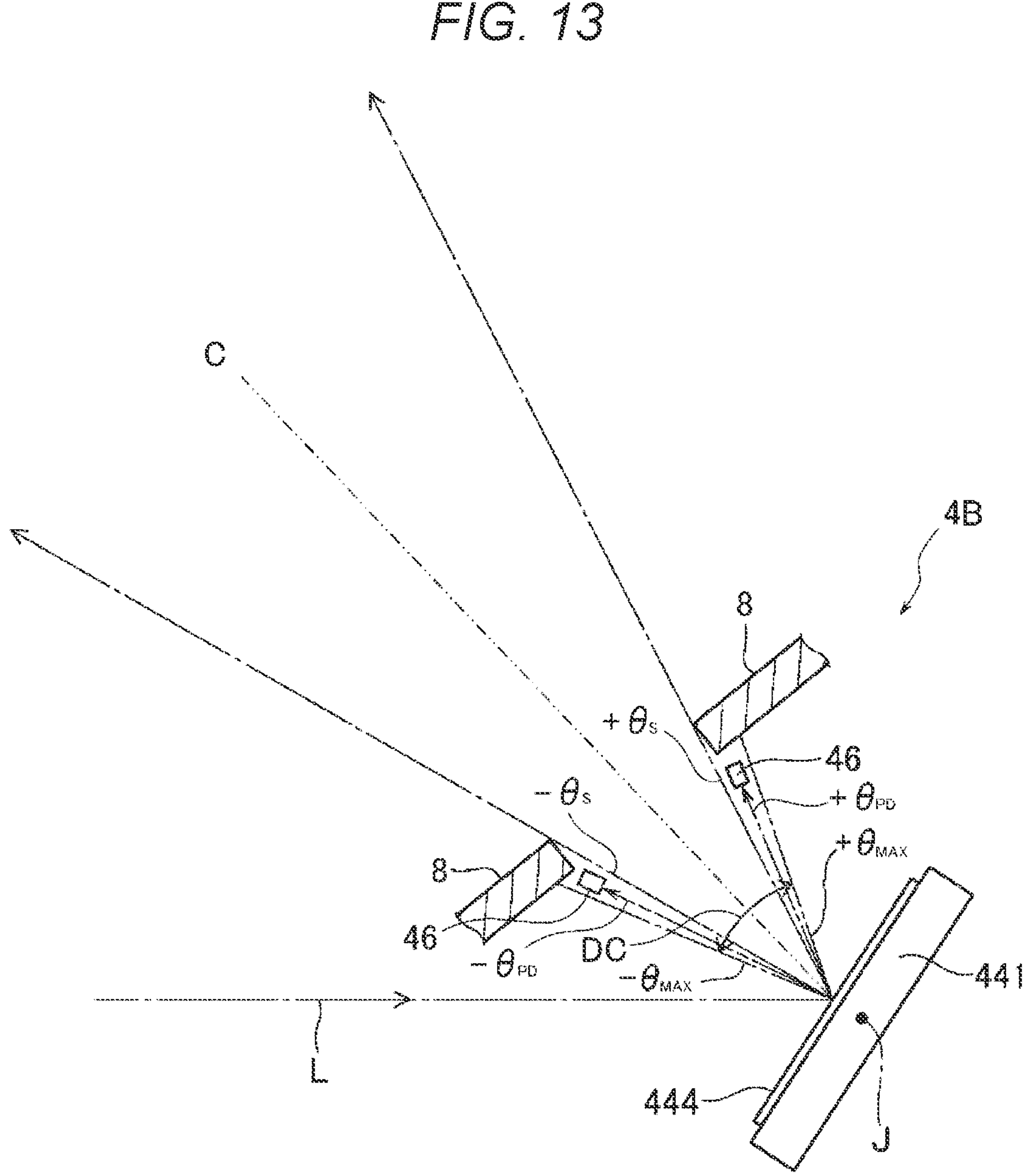
FIG. 13 is a partially enlarged view showing an object recognition sensor as a distance measuring device according to a third embodiment.

FIG. 13 is a partially enlarged view showing the object recognition sensor 4B as the distance measuring device according to the third embodiment.

As below, the third embodiment will be explained with a focus on the differences from the second embodiment and the explanation of the same items will be omitted. In FIG. 13, the same configurations as those of the above described embodiments have the same signs.

The third embodiment is the same as the second embodiment except that the object recognition sensor 4B includes two light detection units 46.

In the embodiment, as shown in FIG. 13, directions in which the mirror 444 swings are referred to as "swing directions DC" and the center of the swing width in the swing directions DC is referred to as "swing center C". Further, in FIG. 13, the light detection units 46 are respectively provided at both sides in the swing directions DC with the swing center C in between.

The plurality of light detection units 46 are provided, and thereby, the light reflected by the mirror 444 may be received not only at the plus side but also at the minus side of the swing angle $\theta$ of the mirror 444 and the relationship between the swing angle $\theta$ and the light reception time may be obtained. Therefore, data as reference for control of the time to draw the pattern light PL may be increased. As a result, the draw reproducibility of the pattern light PL may be further increased.

Note that the number of light detection units 46 is not limited to two, but three or more.

In the above described third embodiment, the same effects as those of the second embodiment may be obtained.

As above, the distance measuring device and the robot according to the present disclosure are explained based on the illustrated embodiments, however, the distance measuring device and the robot according to the present disclosure are not limited to the above described embodiments. The configurations of the respective parts may be replaced by arbitrary configurations having the same functions. Alternatively, other arbitrary configurations may be added to the distance measuring device and the robot according to the above described embodiments.

Alternatively, the distance measuring device according to the present disclosure may be provided in another apparatus than the robot.

What is claimed is:

1. A distance measuring device comprising:

a light source configured to emit a linear laser beam;

a light scanner including a mirror that reflects the linear laser beam from the light source by a reflection surface of the mirror while swinging and generating a pattern light on an object;

a light detector facing the reflection surface of the mirror, the light detector being configured to receive reflected light from the mirror to output a light reception signal, the reflected light being generated by reflecting the linear laser beam at the mirror;

a light shield configured to block a part of the reflected light thereby and pass a remaining part of the reflected light toward the object via a shield opening;

an imaging sensor configured to capture the pattern light on the object to generate captured image data;

a memory configured to store a program; and a processor configured to execute the program so as to:

measure a distance from a reference point to the object based on the captured image data; and control the light scanner with respect to the generation of the pattern light on the object based on the light reception signal, wherein the light detector is located further at an upstream side along a path of the reflected light than the light shield and located adjacent to an edge of the shield opening of the light shield.

2. The distance measuring device according to claim 1, further comprising a housing housing the light source, the light scanner, and the light detector.

3. The distance measuring device according to claim 1, wherein the light detector is configured with a first light detector and a second light detector, and the first and second light detectors are respectively provided at both sides in swing directions with respect to a swing center, where the swing directions are directions in which the mirror swings and the swing center is a center of a swing width in the swing directions.

4. The distance measuring device according to claim 1, wherein the light scanner includes a mirror drive magnet configured to drive the mirror, and a frequency at which the mirror drive magnet drives the mirror is different from a resonance frequency of the mirror.

5. The distance measuring device according to claim 1, wherein the light detector is placed at a position that is in a range of 35% to 90% of a maximum swing amplitude of the mirror at all times.

6. The distance measuring device according to claim 5, wherein the light detector is placed at a position that is in a range of 80% to 90% of the maximum swing amplitude of the mirror at all times.

7. A robot comprising the distance measuring device according to claim 1.

* * * * *